United States Patent

[11] 3,578,762

[72] Inventors George Siebol
            Orange;
            Robert F. Kolec, Whittier, Calif.
[21] Appl. No. 815,825
[22] Filed Apr. 14, 1969
[45] Patented May 18, 1971
[73] Assignee Armco Steel Corporation
            Middletown, Ohio

[54] SELF-DRILLING, REAMING AND TAPPING SCREW
     2 Claims, 3 Drawing Figs.
[52] U.S. Cl. ................................................. 85/41,
                                                            77/66
[51] Int. Cl. ........................................ F16b 25/00
[50] Field of Search ................................. 85/41, 47,
        43, 44, 1 (P); 10/152, 140, 141; 77/65, 66;
                                                           145/50.1

[56]                  References Cited
                  UNITED STATES PATENTS
   93,824   8/1869  Humphreys .................  10/140
  805,170  11/1905  Thomas .......................  77/66
2,479,730   8/1949  Dewar .........................  85/47
3,094,894   6/1963  Broberg .......................  85/47
3,094,895   6/1963  Broberg .......................  85/47
3,156,152  11/1964  Reed ...........................  85/41
3,463,045   8/1969  Prescott ......................  85/41
                  FOREIGN PATENTS
  696,358  10/1964  Canada .......................  85/41
  902,101  11/1944  France .......................  77/66
1,268,396   6/1961  France .......................  85/47

Primary Examiner—Marion Parsons, Jr.
Attorney—Melville, Strasser, Foster and Hoffman ABSTRACT: A fastener comprising a screw having a head adapted to be engaged by means whereby it may be rotated so as to force it into a workpiece or the like at one end and a workpiece-engaging point at the other end. This fastener is designed to have the maximum tensile strength in the total fastener. To this end the shank of the screw, between the point and head, is formed into three sections. The first section, moving from the point towards the head, is of relatively small diameter and is provided with a pair of cutting edges having flutes extending therefrom whereby this section functions as a pilot drill, The next or intermediate section is of larger diameter: The aforementioned grooves or flutes extend into this section and define a second pair of cutting edges. Additionally, however, this intermediate section is provided with other cutting edges and flutes whereby this intermediate section constitutes a reaming section having multiple cutting edges with flutes extending therefrom These drilling and reaming sections are designed to give a positive round hole of the proper diameter so that the threaded section can engage the sides of the hole and distort the sheet metal enough so that a firm fastening is accomplished. The third section, therefore, that immediately adjacent the head, is provided with self-tapping screw threads of substantially constant diameter and uninterrupted by any grooves, flutes or the like.

PATENTED MAY 18 1971
3,578,762
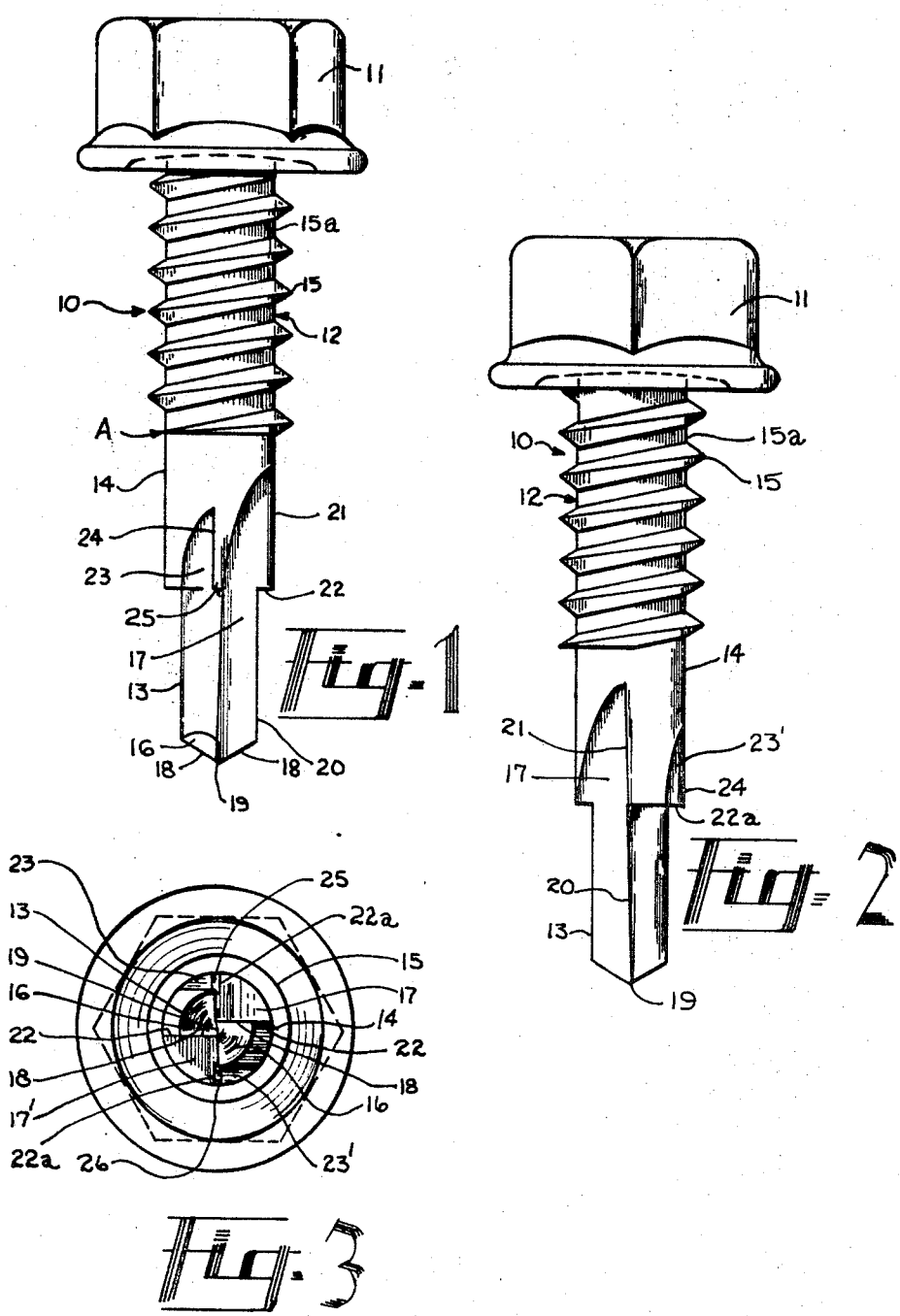
INVENTOR/S
GEORGE SIEBOL
ROBERT F. KOLEC
BY *Melville, Strasser, Foster and Hoffman*
ATTORNEYS

SELF-DRILLING, REAMING AND TAPPING SCREW

BACKGROUND OF THE INVENTION

1. Field of the Invention

The screw of this invention has wide application. It has particular application in those fields requiring high quality fastening jobs, such as in the fastening of sheeting panels to structural framework in metal buildings, wherein it has heretofore usually been the practice to first drill through the workpiece or the like to form a hole which is then reamed out with a multiflute reamer before the fastener is applied, whereafter it is also tapped, all prior to forcing the screw into its holding position. It is, therefore, especially suited for uses in which the screw must be forced into or through relatively hard materials.

2. Description of the Prior Art

Although a search of the prior patent art has been conducted in order to ascertain the most pertinent of such art, no assertion is made that the best art was indeed located. The following patents, however, appear to be most representative of the art to which this invention relates. U.S. Pat. No. 2,388,482 discloses a surgical screw having a drill portion, a tapping portion having threads interrupted by certain grooves, and a threaded holding section. U.S. Pat. No. 2,479,730 discloses a drill section, a tapered and threaded tapping section, and a holding section. U.S. Pats. Nos. 3,094,895 and 3,125,923 are similar; each includes a drilling section, a tapered and threaded tapping section, a holding section and a plurality of grooves extending through the drilling and tapping sections into a portion of the holding section.

One of the problems encountered in the prior art is the length of time it takes to set a screw. Another problem has been the lack of adequate holding power once the screw has been set. Both of these problems are solved by the instant invention.

SUMMARY OF THE INVENTION

This invention resides in the provision of a screw having a pointed, pilot drill section of a relatively small diameter and terminating at a multiple-fluted reaming section which in turn terminates at the beginning of the threaded section which has constant-diameter threads which serve to both tap the work being entered and to hold the screw therein; these threads are uninterrupted by any grooves, flutes or the like and no taper is imparted thereto. In effect, therefore, this fastener or screw encompasses the sequence of a two-drill system in a one-piece fastener. The two-drill system enables the speedy formation of a positive round hole of just the right size to receive the desired threads. By eliminating the threaded, tapered entering portion utilized by the prior art, and by doing away with the interruptions imparted to these threads by prior art arrangements, increased holding power of the fastener of this invention is achieved. The pilot drill section makes it easy to make the initial penetration of even very hard materials. Time being of the essence, it is easier and quicker to drill through a small hole and then follow with a reaming section whereafter the threads are formed, all with the single fastener of this invention.

BRIEF DESCRIPTION OF THE DRAWING

Referring now to the drawing,

FIG. 1 is a front elevation of the improved screw in its vertical position, point down, FIG. 2 is a view similar to that of FIG. 1 but in which the screw has been rotated clockwise 90°, and FIG. 3 is a bottom plan view of the screw as in the position depicted in FIG. 1.

DESCRIPTION OF THE PREFERRED EMBODIMENT

The screw of this invention is generally indicated at 10. It is provided with any suitable head 11 by means of which it may be engaged by any one of a number of available tools so that it may be rotatably driven into and through various workpieces and the like. The head shown constitutes a hex but this is exemplary only. Such head may be slotted, or otherwise intended, if desired, to receive the blade of a screwdriver or the like. Thus the head 11 may be provided with any convenient, conventional means cooperative with a tool for turning the screw to effect insertion or withdrawal.

The shank, which is generally indicated at 12, of the screw 10 comprises a pilot drill 13, a multiple-fluted reamer 14 and a threaded section consisting of a plurality of constant-diameter threads 15.

The outer end of the pilot drill 13 is provided with a pair of bevels 16 which, in combination with the pair of major grooves or flutes 17, define the two lowermost cutting edges 18 which terminate in a work engaging "point" 19. The major flute corresponding to that indicated at 17 in FIG. 1 is shown at 17' in FIG. 3. In this connection it should be understood that a view taken from the side of the screw directly opposite that shown in FIG. 1 would be identical thereto.

As best seen in FIGS. 1 and 2 the major grooves or flutes 17 extend through the pilot drill 13 and into a substantial portion of the reamer 14. Each flute 17 formed in the cylindrical pilot drill 13 and cylindrical reamer 14 defines a pair of edges 20 and 21 in the pilot drill 13 and reamer 14 respectively. The flute 17 may be formed so as to provide the edges 20 and 21 with any suitable rake angle as may be desired and as is well known in the art. Although a substantially flat, horizontal cutting edge 22 for the reamer section 14 is shown as formed at the juncture of the pilot drill 13 and reamer 14, it may be that a slight angle or bevel having about a 20° lead will be employed.

The reamer 14 is also provided with a pair of supplementary grooves or flutes 23 and 23'. These supplementary flutes 23 and 23' define additional edges 24 located solely within the reamer 14. The flutes 23 and 23' may be formed so as to provide any rake angle which is desired for the edges 24 as is well known in the art. Flutes 17 and 23, in the reamer 14, are separated one from the other as indicated at 25; similarly flutes 17' and 23' are separated by the portion 26, see particularly FIG. 3. The flutes 17 and 23 act as chip removal channels; the flute edges 20, 21 and 24 provide guiding surfaces for the cutting edges 18 and 22, 22a.

From the foregoing, therefore, it will be apparent that the juncture of the reamer 14 with the pilot drill 13 is preferably sharply delineated by the cutting edges 22 and 22a and the reamer is provided with four flutes (17, 17', 23 and 23') two of which, 23 and 23', are located solely within the reamer section 14. These flutes 23 and 23' define a pair of edges 24 and a pair of cutting edges 22a. Each flute 23 is located between flutes 17. In this manner the second drill (the reamer 14) of the two-drill system is provided with multiple-flute cutting edges. While the FIGS. and above description are illustrative of a pilot drill with two cutting surfaces and a reamer with four cutting surfaces, it is within the scope of this invention to use the number of multiple cutting surfaces which causes the drilling and reaming to be accomplished in the least time while still preparing a precisioned round hole for the self-tapping threads of the screw.

The threaded section of the screw shank extends between the reamer 14 and head 11. The minor diameter 15a of the threads 15 is shown as being the same as the diameter of the reamer 14. In actual practice, however, it is better for this thread minor diameter 15a to be slightly less than the diameter of the reamer 14 so as to allow a place for the metal displaced in the threading operation of the workpiece to flow into. The major diameter, of course, of the threads 15 extends beyond that of the reamer 14. None of the flutes 17, 17', 23 and 23', extends so far as to reach any of the threads 15; all of the flutes terminate within the reamer 14. These threads 15, therefore, are completely uninterrupted. It is also to be noted that these threads 15 are at their constant, full diameter throughout except for the usual tapered lead on the first thread starting at A (FIG. 1) and extending for approximately one half of the first revolution; there is no tapered, threaded section or portion as such anywhere along the longitudinal axis of the screw shank 12. The thread 15 is, therefore, substantially a constant diameter, uninterrupted, self-tapping thread. This cylindrical thread section is, therefore, to be distinguished from, and is an improvement over, the self-tapping screws of the prior art having a tapered lead in the threads which dig in a little more with each revolution and which will thereby result in loosening if the screw is partially backed off.

The screw or fastener 10 of this invention utilizes the pilot drill 13 to effect initial penetration of the fastener and the multiple-fluted cutting reamer to thereafter ream the initial hole to the exact size required for the self-tapping threads 15. The fastener 10 is then rotatably pushed down to this self-tapping thread, engaging the thread about the perimeter of the drilled and reamed hole, whereafter the fastener threads its way through the workpiece in which it is being installed. Thus, after initial contact of the workpiece by the portion 19, there is a first stage wherein the pilot drill 13 with its two cutting edges 18 forms an initial hole within the workpiece; after such initial hole is formed the fastener 10 is moved so that the reamer cutting edges 22 and 22a come into fairly abrupt contact with the workpiece surrounding the initial hole whereby the impetus thus imparted to the fastener, particularly the engagement of the reamer 14 with the workpiece, starts a second bite into the work and the hole is drilled or reamed into proper size by the four cutting edges 22 and 22a of the reamer, whereafter the fastener is then so moved as to bring the threads 15 into engagement with the workpiece around the reamed hole whereby such additional impetus starts the threads 15 in their self-tapping operation; these same threads 15, when the fastener 10 is driven home, hold the fastener in place. The drilling and reaming section of the fastener completely penetrates the workpiece before the thread point A hits the workpiece. This allows the pressure of the fastening action to cause inertia forces to overtake static forces.

From the foregoing it will be apparent that the screw of this invention provides for successive drilling, reaming and tapping operations, each performed by a distinct and separate portion of the screw shank. By eliminating threads from the reamer portion, by eliminating any taper from the threads, and by having these threads uninterrupted throughout, a self-drilling, reaming and tapping screw is obtained which is quickly installed and with increased holding power.

We claim:

1. In a fastener comprising a cylindrical shank having at one end a head to be engaged by a fastener-driving tool and having at the other end a portion to engage a workpiece and the like; the improvement which comprises providing said shank with three separate sections extending from workpiece-engaging portion to the head, said sections comprising consecutively: a pilot drill of relatively small diameter and having a pair of cutting edges; a reamer of larger diameter and having additional cutting edges; and a constant-diameter, uninterrupted, self-tapping and holding threaded portion, the major diameter of the threads in said threaded portion being greater than the diameter of said reamer, all of said cutting edges having flutes extending therefrom and terminating within said reamer short of said threaded portion; said flutes comprising a first pair extending from said pair of cutting edges throughout all of said pilot drill and part of said reamer and a second pair extending from said additional cutting edges and lying within a portion only of said reamer, both pairs of said flutes terminating short of said threaded section.

2. The fastener of claim 1 in which the juncture between said pilot drill and said reamer is defined by said additional cutting edges, at least some of said additional cutting edges in said reamer being defined by those flutes which extend from the said pair of cutting edges in said pilot drill.